US008801416B2

(12) United States Patent
Uneme

(10) Patent No.: US 8,801,416 B2
(45) Date of Patent: Aug. 12, 2014

(54) COMPRESSION MOLDING MACHINE

(75) Inventor: Tomoki Uneme, Kyoto (JP)

(73) Assignee: Kikusui Seisakusho Ltd., Kyoto-Shi, Kyoto (JP)

( * ) Notice: Subject to any disclaimer, the term of this patent is extended or adjusted under 35 U.S.C. 154(b) by 166 days.

(21) Appl. No.: 13/317,695

(22) Filed: Oct. 26, 2011

(65) Prior Publication Data

US 2012/0135100 A1 May 31, 2012

(30) Foreign Application Priority Data

Nov. 29, 2010 (JP) ................................ P2010-264587

(51) Int. Cl.
*B29C 43/06* (2006.01)
*B29C 43/08* (2006.01)

(52) U.S. Cl.
USPC ................................ 425/78; 425/317; 425/345

(58) Field of Classification Search
USPC ............ 425/135, 225, 226, 345, 406, 78, 317
See application file for complete search history.

(56) References Cited

U.S. PATENT DOCUMENTS

| | | | | |
|---|---|---|---|---|
| 5,596,865 | A * | 1/1997 | Kramer | 53/428 |
| 7,381,356 | B2 * | 6/2008 | Shimada et al. | 425/345 |
| 2010/0092694 | A1 * | 4/2010 | Bohlmann et al. | 427/557 |

FOREIGN PATENT DOCUMENTS

| | | | |
|---|---|---|---|
| JP | 4315905 B2 | 8/2009 | |
| JP | 2010-023083 A | 2/2010 | |
| WO | WO 2004/028711 A1 | 4/2004 | |

* cited by examiner

*Primary Examiner* — Joseph S Del Sole
*Assistant Examiner* — Thukhanh Nguyen
(74) *Attorney, Agent, or Firm* — McGinn IP Law Group, PLLC

(57) ABSTRACT

In order to achieve reduction of a space occupied in a plant for manufacturing pharmaceutical tablets or the like, there is provided a compression molding machine that includes a table, an upper punch and a lower punch, a molded product collection mechanism, a molded product reservoir, and a housing for accommodating a connection end of an air convey path connected to the molded product reservoir. In this configuration, there is no need to additionally provide a dust removing device or a lifter outside the machine.

14 Claims, 7 Drawing Sheets

COMPRESSION MOLDING MACHINE

BACKGROUND OF THE INVENTION

1. Field of the Invention

The present invention relates to a compression molding machine that compresses a powdery material to mold a pharmaceutical tablet, a food product, an electronic component, or the like.

2. Description of the Related Art

There has been known a compression molding machine in which die holes are provided so as to penetrate a table in a vertical direction, and an upper punch and a lower punch are retained above and below each of the die holes so as to be slidable in the vertical direction, so that a powdery material filled in each of the die holes is subject to tableting so as to be compressed and molded (refer to Japanese Unexamined Patent Publication No. 2010-023083, for example).

When a product molded into a tablet by such a compression molding machine is taken out, dust of an excessive powdery material, a lubricant, or the like may adhere to a surface of the molded product. Even in a case where such dust does not adhere to a surface of the molded product, the dust is discharged together with the molded product. In order to remove such dust from the molded product, there are cases of using a dust removing device for separating dust from a molded product that is being conveyed by pressurized air and collecting the separated dust (refer to Japanese Patent No. 4315905, for example).

The dust removing device described in Japanese Patent No. 4315905 also functions as a lifter for lifting upward molded products that are discharged from the compression molding machine. Such a configuration enhances usability in feeding the molded products into one of devices for performing various subsequent processes including classifying, coating (such as film coating and sugar coating), and packaging (such as canning) the molded products that have been lifted upward.

The dust removing device described above or a lifter not having such a powder removing function is provided outside the compression molding machine. Accordingly, such a device occupies a certain necessary space in a plant.

SUMMARY OF THE INVENTION

In view of the above circumstances, it is a desired object of the present invention to achieve reduction of a space occupied in a plant.

According to the present invention, a compression molding machine includes: a table having at least one die hole penetrating in a vertical direction; paired upper and lower punches each having a tip for sliding in the die hole to compress and mold a powdery material filled in the die hole; a molded product collection mechanism for collecting a molded product extracted from the die hole in the table; a molded product reservoir for temporarily reserving the molded product collected by the molded product collection mechanism; a convey path connected to the molded product reservoir so as to allow the molded product temporarily reserved to be conveyed therealong; and a housing for accommodating the table, the upper punch, the lower punch, the molded product collection mechanism, the molded product reservoir, and a connection end of the convey path, the connection end being connected to the molded product reservoir. Herein, a powdery material and dust each contain collective solid fine substances, and conceptually include a so-called granular material or a powdered substance smaller than particles. In the above configuration, there is no need to additionally provide a dust removing device or a lifter outside the machine, which realizes reduction in space.

Preferably, the compression molding machine further includes a gas supply device for supplying air into the convey path. In this configuration, the molded product can be conveyed in the convey path by means of air. The convey path allows the molded product to be conveyed by means of air as well as allows dust adhering to the molded product to be removed.

Further, preferably, the compression molding machine further includes a turning device for turning the convey path about the connection end connected to the molded product reservoir. In this configuration, it is possible to adjust the height of a molded product discharge end provided opposite to the connection end of the convey path. The height of the discharge end can be arbitrarily adjusted in accordance with presence of a subsequent process or details thereof.

The convey path is preferably turnable in a range of angles from a substantially horizontal state to a substantially vertical state.

Further, the convey path may be configured to be extensible.

The convey path is preferably provided with a molded product discharge end opposite to the connection end, and the discharge end is located in the housing. In the above configuration, the convey path can be accommodated in the housing in a case where further reduction in space is required or in a case where the compression molding machine itself is moved.

The collection mechanism may be provided, for example, with a molded product chute for allowing the molded product extracted from the die hole to fall from a upper surface of the table.

DESCRIPTION OF THE PREFERRED EMBODIMENT

Figure 1:
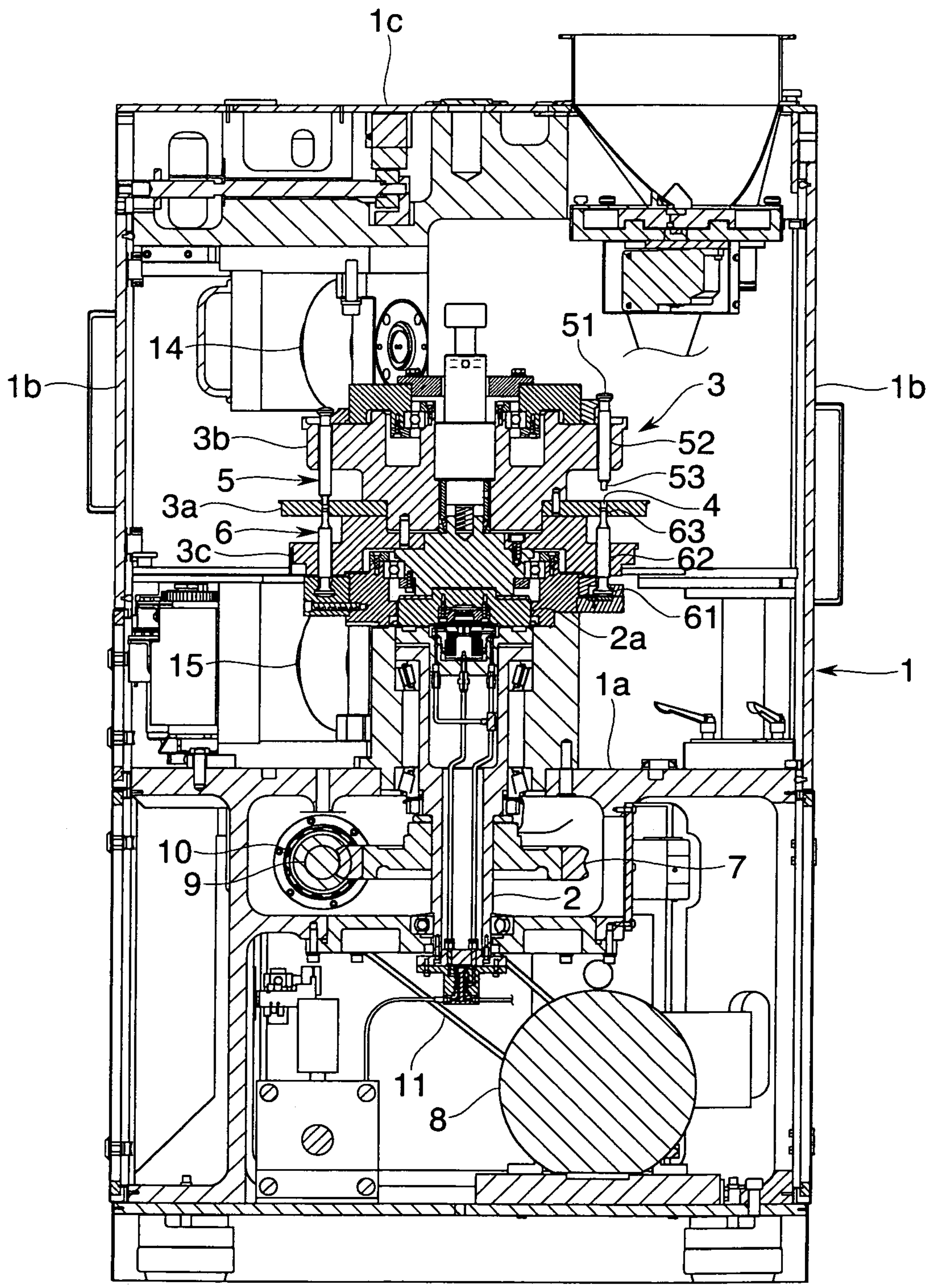
FIG. 1 is a vertical sectional view of a main body of a compression molding machine according to an embodiment of the present invention.

Described below is an embodiment of the present invention with reference to the drawings. A compression molding machine according to the present embodiment includes a so-called rotary tableting machine and a dust removing device provided integrally with each other. The compression molding machine according to the present embodiment includes a table 3*a*, paired upper and lower punches 5 and 6, a powdery material supply mechanism, a molded product collection mechanism, a molded product reservoir 20, a convey path 21, and a housing 1. The table 3*a* is provided with at least one die hole 4 that penetrates in a vertical direction. The paired upper and lower punches 5 and 6 are located above and below each die hole 4. The powdery material supply mechanism includes a feed shoe 16 that fills a powdery material into each die hole 4. The molded product collection mechanism collects, from the table 3*a*, a molded product obtained by compressing and tableting the powdery material in the die hole 4. The molded product reservoir 20 temporarily reserves the collected molded product. The convey path 21 allows the molded product reserved in the molded product reservoir 20 to be conveyed therealong by means of air as well as causes dust adhering to the molded product to be removed therefrom. The housing 1 accommodates the table 3*a*, the punches 5 and 6, the powdery material supply mechanism, the molded product collection mechanism, the molded product reservoir 20, the convey path 21, and the like.

Figure 2:
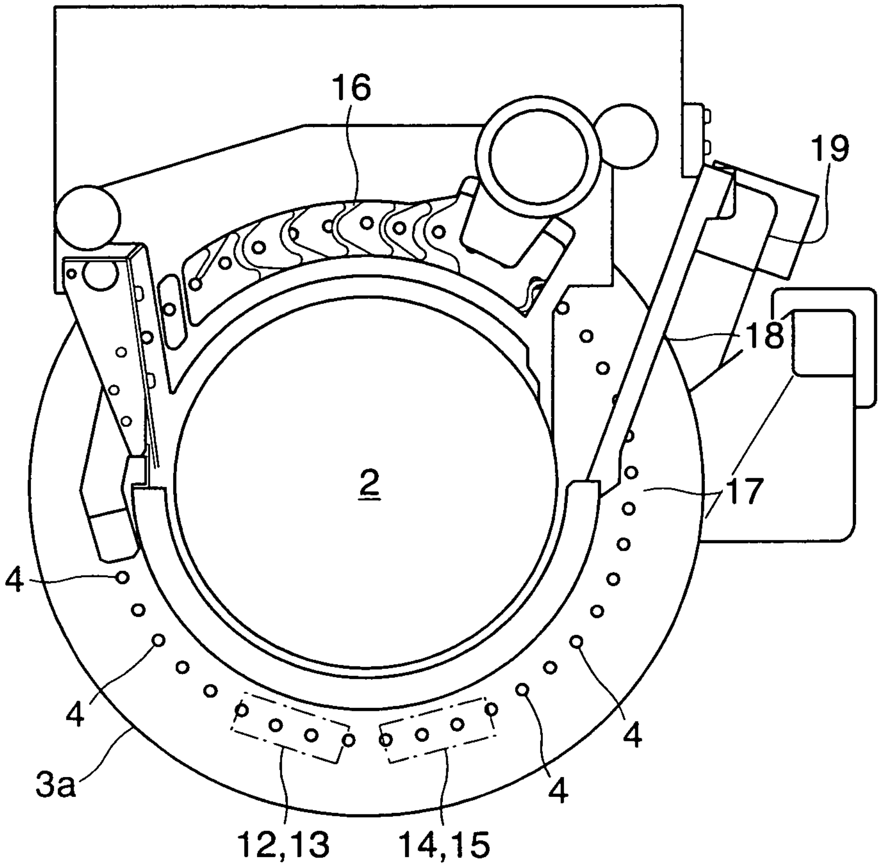
FIG. 2 is a plan view of a main part in the main body of the compression molding machine according to the embodiment.
Figure 3:
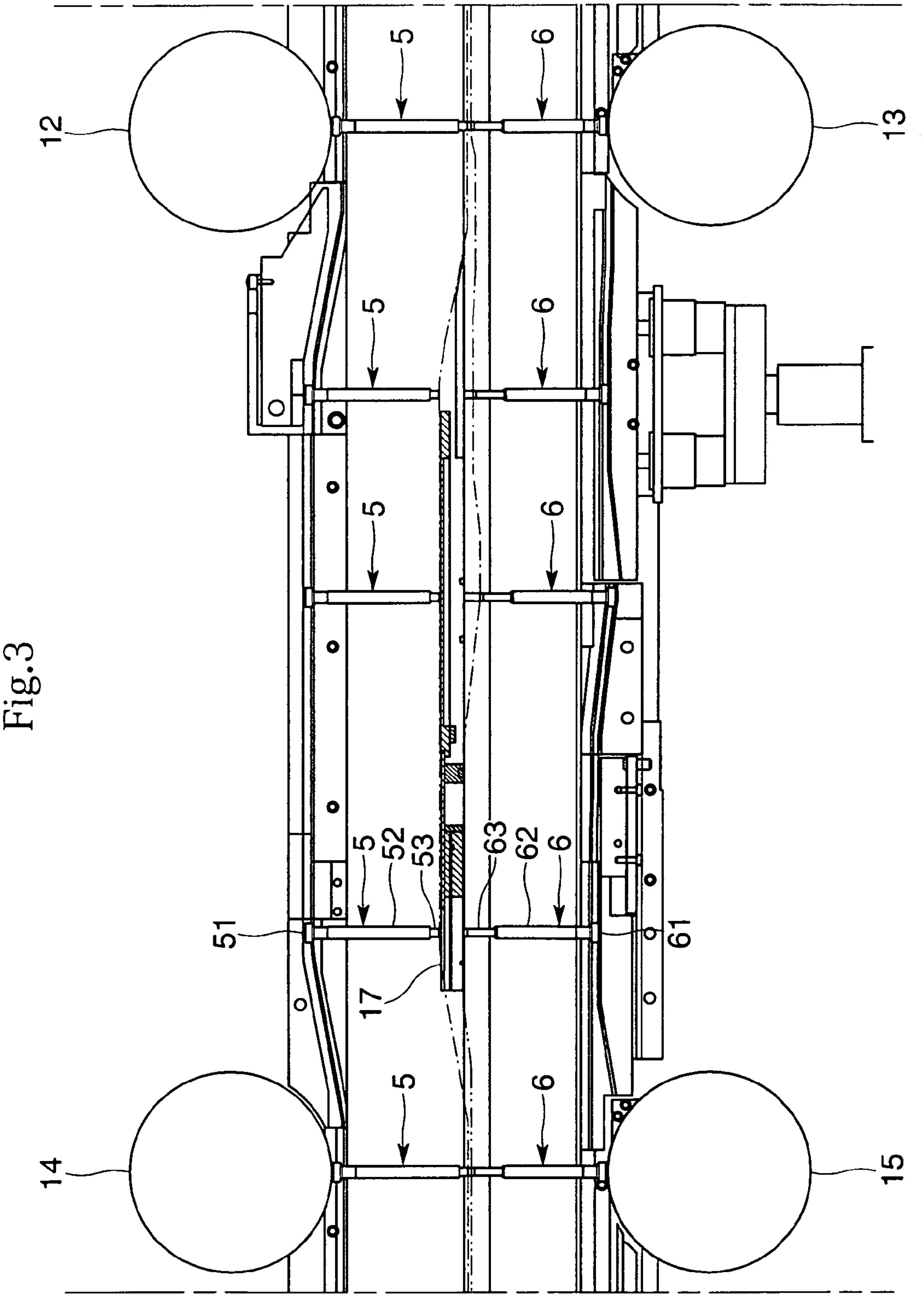
FIG. 3 is a view of the cylindrical projection showing a relationship between punches and rolls in the main body of the compression molding machine according to the embodiment.

FIGS. 1 to 3 each show the compression molding machine. Specifically, the housing 1 of the compression molding machine is configured by a frame 1*a* as a base, an outer casing 1*b* that surrounds, from every lateral direction, an internal space above the frame 1*a*, and a top plate 1*c* that closes the internal space from above. There is provided an upright shaft 2 that stands in the internal space and functions as a rotary shaft, and a turret 3 is attached to a connection portion 2*a* that is located at an upper portion of the upright shaft 2.

The turret 3 horizontally rotates about the upright shaft 2, more specifically, spins. The turret 3 is configured by the table (die disc) 3*a*, an upper punch retaining portion 3*b*, and a lower punch retaining portion 3*c*. As shown in FIG. 2, the table 3*a* has a substantially circular disc shape, and a plurality of die holes 4 are provided in an outer peripheral portion thereof so as to be aligned in a direction of rotation and be spaced apart from each other at predetermined intervals. The die holes 4 each penetrate the table 3*a* in the vertical direction. The table 3*a* may be composed of a plurality of divided plates. Instead of the die holes 4 provided directly in the table 3*a*, a plurality of die members may be provided separately from the table 3*a* so as to be detachably attached to the table 3*a*. In this case, the die members are each provided with a die hole that penetrates in the vertical direction.

The upper punch 5 and the lower punch 6 are retained above and below corresponding one of the die holes 4, by the upper punch retaining portion 3*b* and the lower punch retaining portion 3*c*, so as to be individually slidable in the die hole 4 in the vertical direction. Each upper punch 5 has a tip 53 that enters and exits the corresponding die hole 4. Each lower punch 6 has a tip 63 that is always inserted in the corresponding die hole 4. The upper punch 5 and the lower punch 6 horizontally rotate about the upright shaft 2 together with the turret 3, more specifically, revolve.

The upright shaft 2 is provided, at the lower end, with a worm wheel 7. The worm wheel 7 meshes with a worm gear 10. The worm gear 10 is fixed to a gear shaft 9 that is driven by a motor 8. Drive power outputted from the motor 8 is transmitted to the gear shaft 9 by way of a belt 11, so as to drive to rotate the upright shaft 2 by way of the worm gear 10 and the worm wheel 7, and further to rotate the turret 3 as well as the punches 5 and 6.

A shown in FIGS. 2 and 3, a pre compression upper roll 12, a pre compression lower roll 13, a main compression upper roll 14, and a main compression lower roll 15 are provided on orbits of the punches 5 and 6 that revolve about the upright shaft 2. The pre compression upper roll 12 and the pre compression lower roll 13, as well as the main compression upper roll 14 and the main compression lower roll 15, are respectively paired in the vertical direction so as to sandwich the punches 5 and 6. The pre compression upper roll 12 and the pre compression lower roll 13, as well as the main compression upper roll 14 and the main compression lower roll 15, respectively bias the upper and lower punches 5 and 6 to bring the upper and lower punches 5 and 6 close to each other, so that the tips 53 and 63 compress from above and below the powdery material, which is filled in each of the die holes 4 by the feed shoe 16.

The upper punch 5 and the lower punch 6 have head portions 51 and 61 that are pressed by the rolls 12, 13, 14, and 15, and shaft portions 52 and 62 that are smaller in diameter than the head portions 51 and 61, respectively. The shaft portions 52 and 62 each have a distal end of a diameter smaller than remaining portions and substantially equal to the inner diameter of the die hole 4, so as to be inserted into the die hole 4. The punches 5 and 6 revolve to bring the rolls 12, 13, 14, and 15 close to the head portions 51 and 61 of the punches 5 and 6. The rolls 12, 13, 14, and 15 move to step onto the head portions 51 and 61 and come into contact therewith. Further, the rolls 12, 13, 14, and 15 roll over the head portions 51 and 61 and are displaced in the horizontal direction, during which pressing downward each upper punch 5 and pressing upward each lower punch 6, respectively. While the rolls 12, 13, 14, and 15 are in contact with top flat surfaces of the punches 5 and 6, the punches 5 and 6 apply constant pressure onto the powdery material in the corresponding die hole 4.

A product unloading portion 17 is provided ahead, in the directions of rotation of the turret 3 and the punches 5 and 6, of the position where the main compression upper roll 14 and the main compression lower roll 15 apply pressure. At the product unloading portion 17, the lower punch 6 ascends until the end surface of the tip 63 of the lower punch 6 reaches the height substantially same as that of the upper end of the die hole 4, in other words, the upper surface of the table 3*a*. The lower punch 6 then pushes the molded product out of the die hole 4.

The product unloading portion 17 is provided with a guide member 18 that guides the molded product pushed out of the die hole 4. The molded product extracted from the die hole 4 is brought into contact with the guide member 18 due to the rotation of the turret 3, and is shifted along the guide member 18 toward a molded product chute 19 that is located at a position where molded products are collected. The guide member 18 may be replaced with an air spray device or the like. The air spray device blows the molded product pushed out of the die hole 4 toward the molded product chute 19. The molded product chute 19 allows the molded product extracted from the die hole 4 to fall from the upper surface of the table 3*a*. Accordingly, in the present embodiment, the guide member 18 (replaceable with an air spray device or the like) and the molded product chute 19 configure the molded product collection mechanism.

The molded product fallen along the molded product chute 19 is temporarily reserved in the molded product reservoir 20. The molded product reserved in the molded product reservoir 20 is conveyed along the convey path 21, which also serves as a dust removing device, and exits the compression molding machine. The convey path 21 has a substantially cylindrical shape, and is connected to the molded product reservoir 20. Alternatively, the convey path 21 may be configured to be extensible.

The convey path 21 has a connection end that is connected, by way of a tube 22, to an air compressor 26 as an exemplary gas supply device. Pressurized air discharged from the air compressor 26 flows in the tube 22 and is then blown out of the tube 22 in a direction along the inner peripheral surface of the convey path 21, in other words, in a direction about an axis extending along the convey path 21. As a result, the molded product reservoir 20 is brought into a vacuum state. Accordingly, air and the molded product are sucked from the molded product reservoir 20 into the convey path 21. The air and the molded product thus having been sucked spirally whirl along the inner peripheral surface of the convey path 21 and flow away from the connection end. The gas supplied from the gas supply device may be air or any gas that does not affect products, such as nitrogen or oxygen.

The convey path 21 has a discharge end located opposite to the connection end. This discharge end is closed by a lid 24 that is provided with a large number of holes having a diameter smaller than that of the molded product. The lid has an outer surface connected to a dust collector (not shown) with a bendable duct 23 being interposed therebetween. Furthermore, the peripheral wall in the vicinity of the discharge end is provided with a molded product discharge port 25. The molded product reserved in the molded product reservoir 20 and dust adhering to the molded product are flown by air discharged from the air compressor 26, and spirally whirl to reach the vicinity of the discharge end. During this process, the dust adhering to the molded product is separated from the molded product. Negative pressure generated by the dust collector causes the dust to pass through the holes provided in the lid 24 to be sucked into the duct 23. However, the molded product separated from the dust cannot pass through any one of the holes in the lid 24, and is discharged out of the convey path 21 through the molded product discharge port 25.

Figure 4:
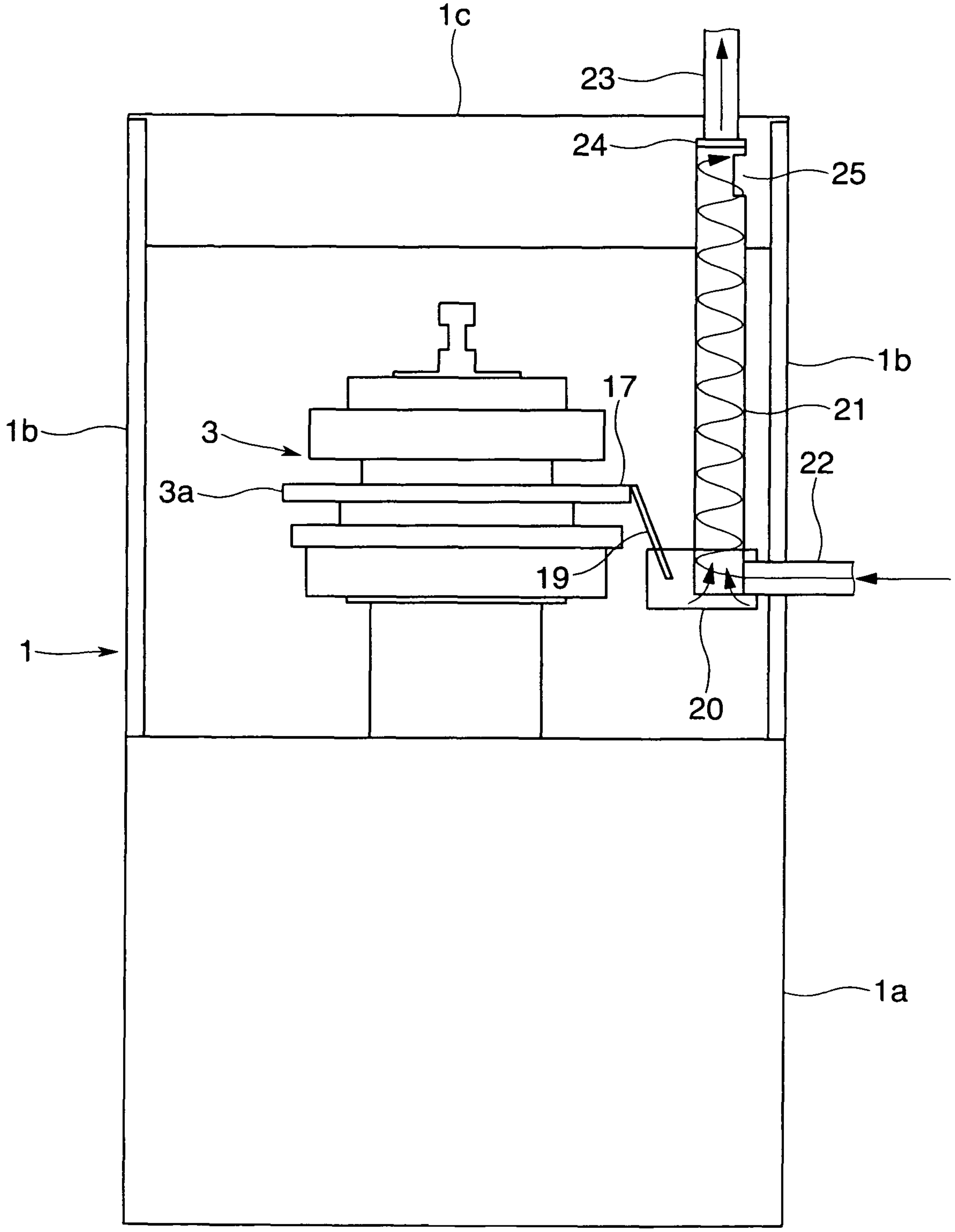
FIG. 4 is a front view schematically showing an entire configuration of the compression molding machine according to the embodiment.
Figure 5:
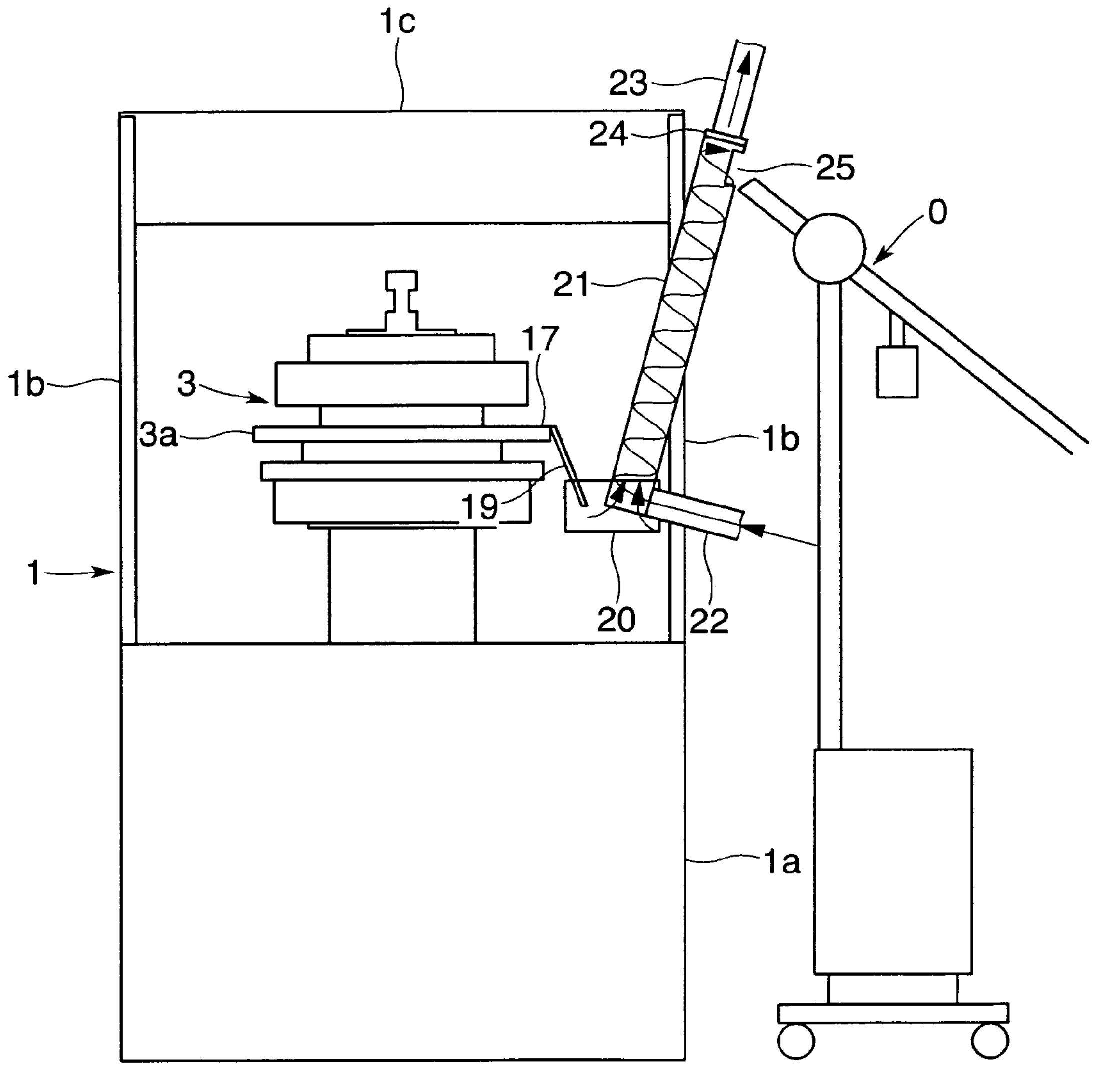
FIG. 5 is a front view schematically showing another entire configuration of the compression molding machine according to the embodiment.
Figure 6:
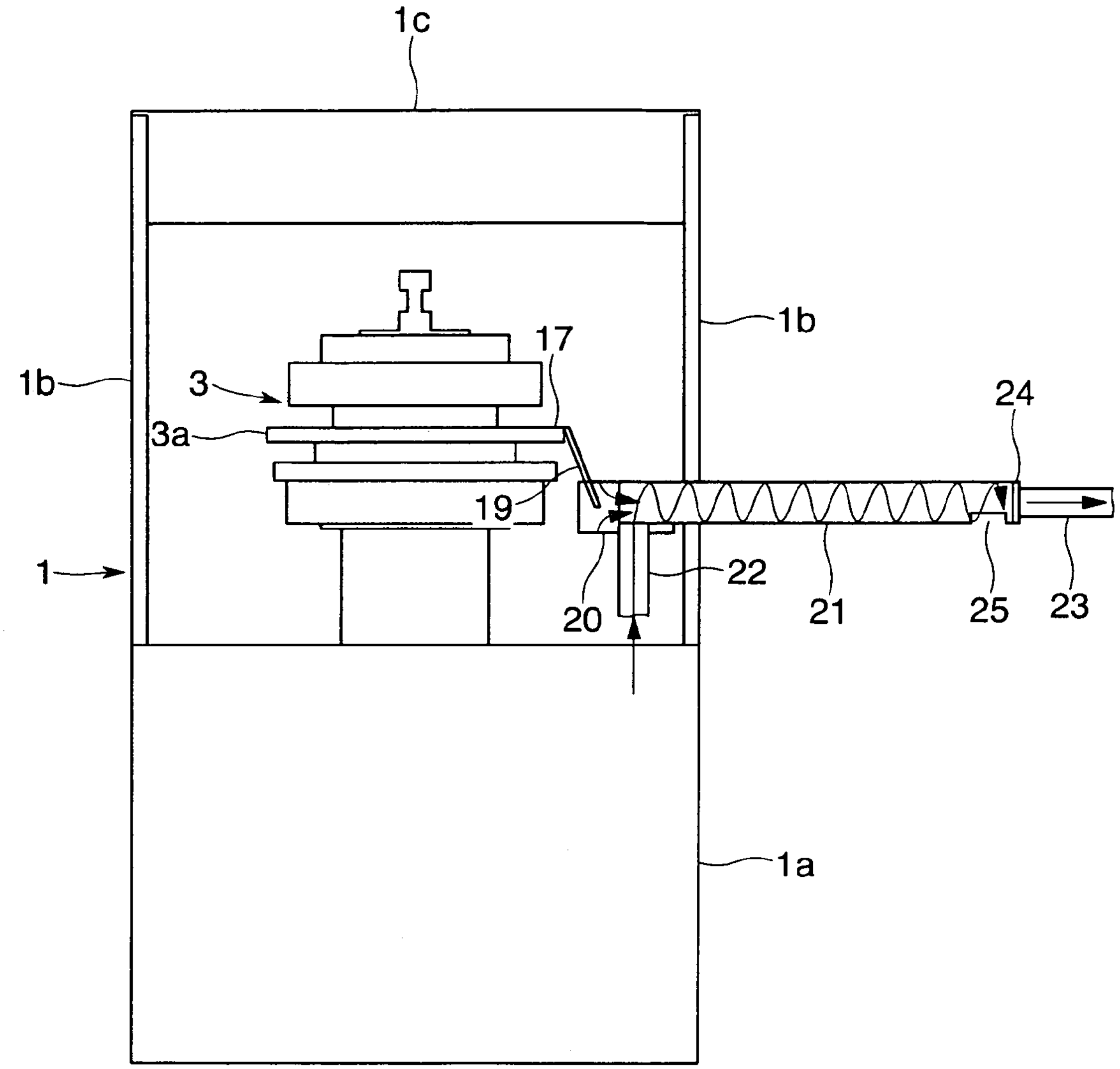
FIG. 6 is a front view schematically showing still another entire configuration of the compression molding machine according to the embodiment.

In the present embodiment, the convey path 21 can be turned upward and downward about the connection end by a turning device 27. Accordingly, it is possible to change the heights of the discharge end as well as the molded product discharge port 25. As shown in FIG. 4, in a case where the convey path 21 is provided substantially in the vertical direction, the discharge end and the molded product discharge port 25 are located in the housing 1, more specifically, laterally inside the outer casing 1*b*. In this case, the molded product may be taken upward out of a port provided in the top plate 1*c*. As shown in FIG. 5, in another case where the convey path 21 is provided to be inclined, the discharge end and the molded product discharge port 25 can be exposed outside the housing 1, more specifically, laterally outside the outer casing 1*b*. FIG. 5 also illustrates a known metal detector 0, which senses and selects any product including a metal piece out of the molded products exiting the molded product discharge port 25, so that products thus selected are collected in a defective product collecting container. As shown in FIG. 6, in still another case where the convey path 21 is turned so as to be provided substantially in the horizontal direction, the discharge end and the molded product discharge port 25 can be located at lower positions. In any one of the above cases, the connection end of the convey path 21 is located in the housing 1.

The turning device 27 may be arbitrarily configured as long as being capable of turning the convey path 21. Nevertheless, the turning device 27 preferably includes a position detection mechanism and a position control mechanism, so as to be capable of stopping the turning convey path 21 at a desired position. Alternatively, the turning device 27 may be configured to manually turn the convey path 21. Still alternatively, the turning device 27 may be configured to stop the turning convey path 21 at a desired position with use of a positioning pin or the like.

In the present embodiment, the compression molding machine includes the table 3*a* provided with at least one die hole 4 that penetrates in the vertical direction, the paired upper and lower punches 5 and 6 that respectively have the tips slidable in the corresponding die hole 4 so as to compress and mold the powdery material filled in the die hole 4, the molded product collection mechanism that collects the molded product extracted from the die hole 4 in the table 3*a*, the molded product reservoir 20 that temporarily reserves the molded product collected by the molded product collection mechanism, the convey path 21 that is connected to the molded product reservoir 20, allows the molded product temporarily reserved in the molded product reservoir 20 to be conveyed therealong by means of air, as well as causes dust adhering to the molded product to be removed, and the housing 1 that accommodates the table 3*a*, the upper punch 5 and the lower punch 6, the molded product collection mechanism, the molded product reservoir 20, and the connection end of the convey path 21 to be connected with the molded product reservoir 20. Accordingly, there needs no additional provision of a dust removing device or a lifter outside the machine, and reduction is achieved in terms of the space occupied by such a device.

The convey path 21 is turnable about the connection end that is connected to the molded product reservoir 20, so as to adjust the height of the molded product discharge end, which is located opposite to the connection end. In this configuration, the height of the discharge end can be arbitrarily adjusted in accordance with presence of a subsequent process or details thereof.

The convey path 21 is turnable in a range of angles from a substantially horizontal state to a substantially vertical state. Therefore, the discharge end of the convey path 21 can be largely exposed from the housing 1 when necessary.

The molded product discharge end, which is provided opposite to the connection end of the convey path 21, can be located inside the housing 1. Accordingly, the convey path 21 can be completely accommodated in the housing 1 in a case where further reduction in space is required or in a case where the compression molding machine itself is moved.

The collection mechanism is provided with the molded product chute 19 that allows the molded product extracted from the die hole 4 to be fall from the disc surface of the table 3*a*. Therefore, the collection mechanism is not complicated in its configuration, which facilitates its maintenance work.

Figure 7:
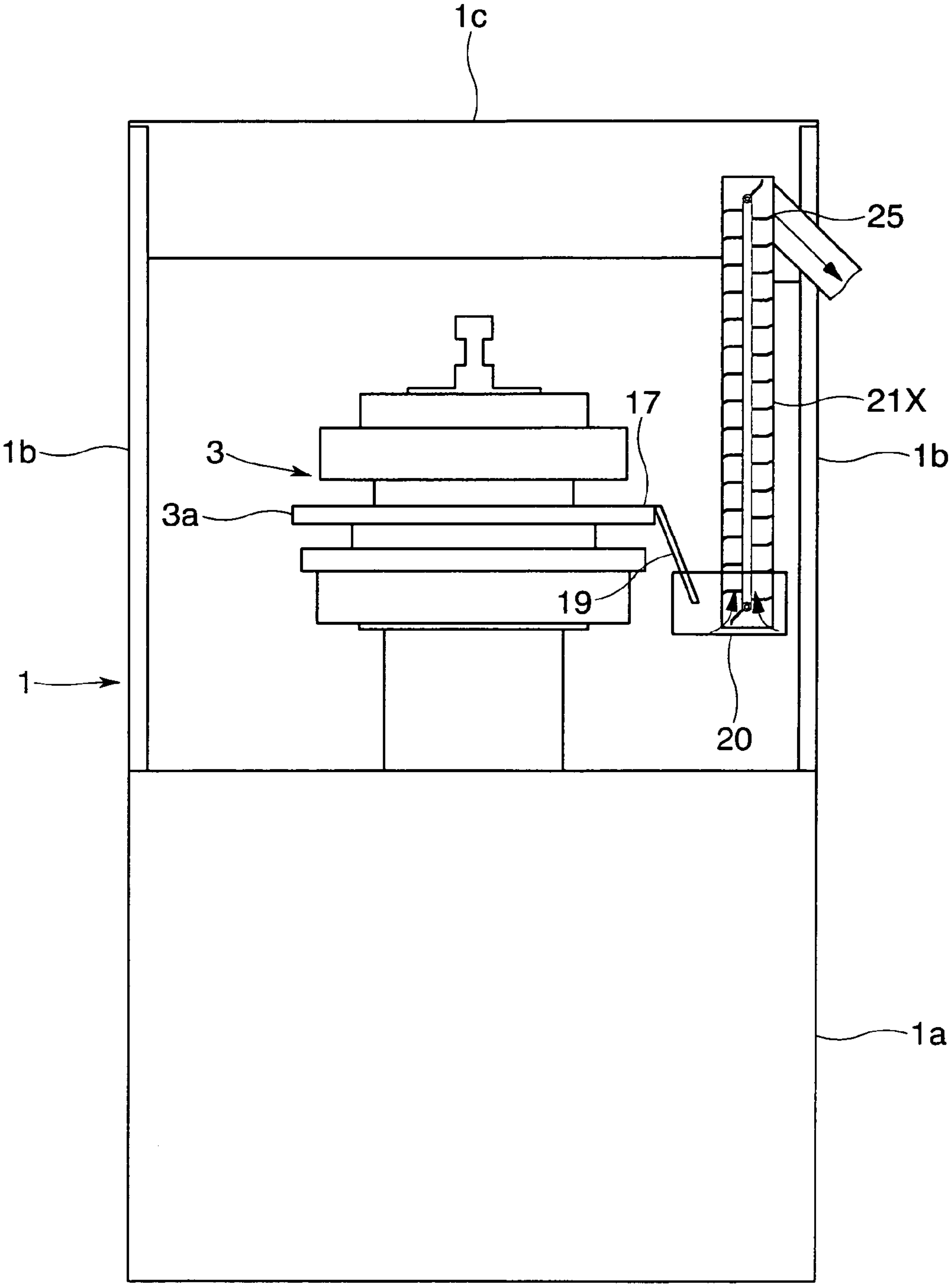
FIG. 7 is a front view schematically showing an entire configuration of a compression molding machine according to a modification of the present invention.

It is noted that the present invention is not limited to the embodiment detailed above. In particular, the convey path 21, which allows the molded products reserved in the molded product reservoir 20 to be conveyed therealong, is not limited to an air convey path. As shown in FIG. 7, in place of the air convey path 21, the compression molding machine may be equipped with a convey path 21X that has a mechanical convey structure for conveying the molded products toward (the molded product discharge port 25 of) the discharge end by means of a bucket lifter, a belt conveyer, or a member reciprocating in a tube path. The convey path 21X is generally provided with no function of removing dust that adheres to a molded product.

The convey path 21X in this configuration is also turnable about the connection end that is connected to the molded product reservoir 20. Therefore, it is possible to adjust the height of the discharge end that is located opposite to the connection end. As shown in FIG. 7, the molded product discharge end of the convey path 21X can be located inside the housing 1. The compression molding machine preferably includes the turning device 27 that turns the convey path 21X in the range of the angles from a substantially horizontal state to a substantially vertical state. However, the convey path 21X may not be necessarily turnable in the range of the angles from a substantially horizontal state to a substantially vertical state, due to the configuration of the convey structure (such as the bucket lifter and the belt conveyer).

The compression molding machine according to the embodiment described above is configured as a rotary tableting machine in which the table 3*a* and the punches 5 and 6 revolve. Alternatively, the compression molding machine may be configured as a tableting machine in which the table 3*a* and the punches 5 and 6 do not revolve but the feed shoe 16 does, a tableting machine of (a non rotary type but) a so-called vertical (reciprocating) type, or the like.

In the molded product collection mechanism, the molded product chute 19 may be replaced with a circular disc conveyer or a belt conveyer that conveys the molded products. Alternatively, such a circular disc conveyer or a belt conveyer may be provided in addition to the molded product chute 19.

The specific configurations of other portions may be modified in various ways as long as not departing from the object of the present invention.

What is claimed is:

1. A compression molding machine, comprising:

a table comprising at least one die hole penetrating in a vertical direction;

paired upper and lower punches each comprising a tip for sliding in the die hole to compress and mold a powdery material filled in the die hole;

a molded product collection mechanism for collecting a molded product extracted from the die hole in the table;

a molded product reservoir for temporarily reserving the molded product collected by the molded product collection mechanism;

a convey path connected to the molded product reservoir so as to allow the molded product temporarily being reserved to be conveyed therealong;

a housing for accommodating the table, the upper punch, the lower punch, the molded product collection mechanism, the molded product reservoir, and a connection end of the convey path, the connection end being connected to the molded product reservoir, wherein the convey path extends with an inclined angle above a lower surface of the molded product reservoir; and a gas supply device for supplying air into the convey path to carry the molded product along an inner peripheral surface of the convey path, wherein the gas supply device is connected to the connection end of the convey path for blowing the air into the convey path in a direction along the inner peripheral surface of the convey path, wherein the convey path is configured to allow the air and the molded product to be sucked from the molded product reservoir into the convey path, and wherein the air and the molded product are sucked spirally in a whirl along the inner peripheral surface of the convey path to flow away from the connection end.

2. The compression molding machine according to claim 1, further comprising a turning device for turning the convey path about the connection end connected to the molded product reservoir.

3. The compression molding machine according to claim 1, further comprising a turning device for turning the convey path about the connection end connected to the molded product reservoir.

4. The compression molding machine according to claim 1, wherein the convey path is provided with a molded product discharge end opposite to the connection end, and the discharge end is located in the housing.

5. The compression molding machine according to claim 2, wherein the convey path is provided with a molded product discharge end opposite to the connection end, and the discharge end is located in the housing.

6. The compression molding machine according to claim 3, wherein the convey path is provided with a molded product discharge end opposite to the connection end, and the discharge end is located in the housing.

7. The compression molding machine according to claim 1, wherein the collection mechanism is provided with a molded product chute for allowing the molded product extracted from the die hole to fall from a disc surface of the table.

8. The compression molding machine according to claim 1, wherein the convey path comprises a separator that separates a dust that is adhered to the molded product such that the convey path discharges the dust from a different discharge port than a discharge port that discharges the molded product.

9. The compression molding machine according to claim 1, wherein the gas supply device is connected to the connection end of the convey path for blowing the air into the convey path in a direction of an axis extending along the convey path.

10. The compression molding machine according to claim 9, wherein the convey path comprises a separator that separates a dust that is adhered to the molded product such that the convey path discharges the dust from a different discharge port than a discharge port that discharges the molded product.

11. The compression molding machine according to claim 1, wherein the convey path is provided with a molded product discharge end opposite to the connection end, and wherein the convey path comprises a lid that closes the discharge end, the lid being provided with holes having a diameter less than a diameter of the molded product to discharge a dust that is separated from the molded product in the convey path.

12. The compression molding machine according to claim 11, wherein a side wall of the convey path in a vicinity of the discharge end is provided with a molded product discharge port to discharge the molded product.

13. A compression molding machine, comprising:

a table comprising at least one die hole;

paired upper and lower punches each comprising a tip for sliding in the die hole to compress and mold a powdery material filled in the die hole;

a molded product collection mechanism for collecting a molded product extracted from the die hole in the table;

a molded product reservoir for reserving the molded product collected by the molded product collection mechanism;

a convey path connected to the molded product reservoir to allow the molded product being reserved to be conveyed, a connection end of the convey path being connected to the molded product reservoir with an inclined angle with respect to a lower surface of the molded product reservoir;

and a gas supply device connected to the connection end of the convey path for blowing air into the convey path to carry the molded product along an inner peripheral surface of the convey path to flow away from the connection end;

wherein the convey path is configured to allow the air and the molded product to be sucked from the molded product reservoir into the convey path, and wherein the air and the molded product are sucked spirally in a whirl along the inner peripheral surface of the convey path to flow away from the connection end.

14. A compression molding machine, comprising:

a table comprising at least one die hole penetrating in a vertical direction;

paired upper and lower punches each comprising a tip for sliding in the die hole to compress and mold a powdery material filled in the die hole;

a molded product collection mechanism for collecting a molded product extracted from the die hole in the table;

a molded product reservoir for temporarily reserving the molded product collected by the molded product collection mechanism;

a convey path connected to the molded product reservoir so as to allow the molded product temporarily being reserved to be conveyed therealong;

a housing for accommodating the table, the upper punch, the lower punch, the molded product collection mechanism, the molded product reservoir, and a connection end of the convey path, the connection end being connected to the molded product reservoir, wherein the convey path extends above the molded product reservoir with an inclined angle with respect to a lower surface of the molded product reservoir; and a gas supply device for supplying air into the convey path to carry the molded product along an inner peripheral surface of the convey path, wherein the gas supply device is connected to the connection end of the convey path for blowing the air into the convey path in a direction along the inner peripheral surface of the convey path, wherein the convey path is configured to allow the air and the molded product to be sucked from the molded product reservoir into the convey path, and wherein the air and the molded product are sucked spirally in a whirl along the inner peripheral surface of the convey path to flow away from the connection end.

* * * * *